United States Patent Office 3,524,945
Patented Aug. 18, 1970

3,524,945

CONTROL FOR CENTRALLY CONTROLLED SWITCHING GRIDS IN TELECOMMUNICATION EXCHANGE SYSTEMS

Hilmar Schönemeyer, Ditzingen, Walter Hackenberg, Hirschlanden, and Herbert Siegel, Munchingen, Germany, assignors to International Standard Electric Corporation, New York, N.Y., a corporation of Delaware Filed Sept. 20, 1966, Ser. No. 580,691
Claims priority, application Germany, Sept. 30, 1965, St 24,446
Int. Cl. H04q 3/48
U.S. Cl. 179—18 2 Claims

ABSTRACT OF THE DISCLOSURE

A common control in the form of a directional switching grid is provided in a telephone system for switching originating and terminating internal traffic as well as outgoing external traffic. A common group marker activates the subscriber circuit or a junction set at the outgoing line.

This invention relates to control devices for centrally controlled switching grids of telecommunication and particularly telephone exchange systems. More particularly, this invention relates to unique arrangements and groupings of control equipment in telephone exchanges.

The control devices at telephone exchanges have in the past been arranged into three different groups. In such arrangements, the first group is for controlling traffic originating at the exchange. The second group of control equipment is for controlling incoming trunk traffic. The third group of control equipment is for controlling outgoing trunk traffic. The groups each include control equipment, such as registers, markers, and translators, as well as access or directional grids. The directional grids are used for inter-connecting equipment such as connectors or for connecting the outlets of switching networks to equipment such as distributors. For example, if an internally originated call is going to another exchange, then the call must be directed to a distributor point which will take it either to the directly connected other exchange or to a toll exchange. Thus, the directional grid is the matrix which is controlled to direct the call to, for example, the proper coupling of the distributor.

These control groups form function groups which can operate nearly independently. Such a strict separation of the control groups requires a corresponding expenditure in control devices.

Accordingly, it is an object of this invention to provide an exchange arrangement for maintaining the above described grouping of control equipment, but at the same time to economize on the equipment required.

A related object of this invention is to combine certain equipment used both in the control group for controlling the calls originating at the exchange and in the control group for controlling the outgoing trunk calls from the exchange.

The above-mentioned and other objects of this invention together with the manner of obtaining them will become more apparent, and the invention itself will be best understood by making reference to the following description of an embodiment of the invention taken in conjunction with the accompanying drawings wherein:

FIG. 1 shows a control group for originating and terminating internal traffic. This group has been designated group A.

Figure 3:
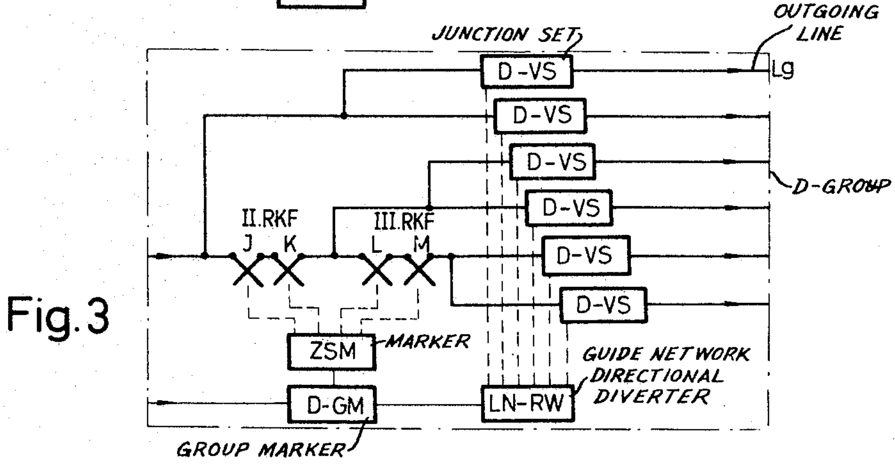

A connection is established within the switching grid from the terminal point of the calling subscriber T*ln*, that is from the subscriber circuit TS, accommodated in the switching multiple of the stage A, via a final grid EKF and a mixing grid MKF to a junction set A–VS which power-supplies this connection route. From this junction set A–VS the connection leads via a first directional grid I. RKF to an intermediate distributor, common to all control groups of the exchange system. There, the connecting routes are subdivided; on one hand they lead to the junction sets B–VS for the call subscriber of within the group A and further groups A of the exchange system, and, on the other hand, to the control groups for the outgoing or external traffic, the so-called groups D. From there the routes are extended to other exchanges and to the telephone toll level. It must be mentioned that outgoing trunk groups with a high traffic load are directly branched off at the first directional grid I. RKF of the A-groups, while trunk groups with a lower traffic load are connected to the second or even the third directional grids of the D-group (FIG. 3). Within the A-group the traffic going to a called subscriber leads from the junction set B–BS back to the switching stage D in the mixing grid MFK. The mixing grid MKF as well as the final grid EKF are used for both traffic directions, outgoing and terminating. The junction set A–VS has access to the registers A–R*g* via a register finder grid R*g*KF with the switching stages E and F.

A directional marker RM is provided in the marking network, having several tasks. Said directional marker secures that two or several registers A–R*g* do not simultaneously carry out a marking. It receives the call number from the register, interrogates further setting information from a guiding translator LZO, common to all control groups of the exchange and finally through-connects the marking net to other control groups via a group connector GV. A group marker GM controls the connections from the calling subscribers to the register A–R*g* and the terminating traffic for the subscribers within the control group. Intermediate stage markers ZSM1 and ZSM2 and a final stage marker ESM with a stage marker connecter SM–V carry out the route search within the switching network and the through-connection of the route. Each final switching grid EKF with a defined number of subscriber lines disposes of a final marker EM which secures access to the subscriber lines TS for testing and marking purposes. The originating call barrier A*n*S*p*, associated to the same group of subscriber lines prevents, while a connection is terminating, that a new request for a connection from subscribers T*ln* of this control group becomes effective. In a class-of-service translator KZO possibilities of jumpering for special criteria, individually assigned to the subscribers, are stored, the consideration of which substantially increases the flexibility of the control during the marking processes. Finally a guide network group diverter LN–BW and a guide network super group diverter LN–GW serves to handle special tasks during the route search in the guiding network of the crosspoint arrangement.

Figure 2:
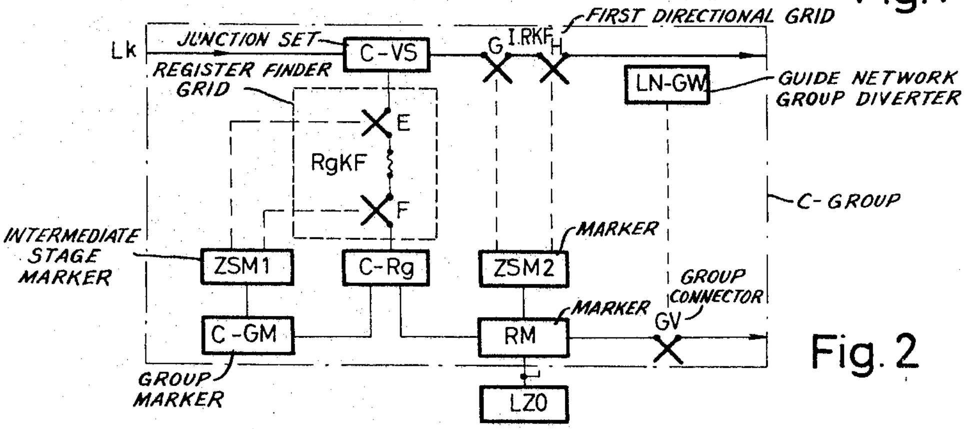

FIG. 2 shows a block diagram of a control group for terminating external traffic, the so-called C-group, comprising a defined number of lines L*k*, arriving from other exchanges or from the toll call level. Each terminating line L*k* ends in a junction set C–VS. From there the connection is led via a first directional grid with the switching stages G and H to the common intermediate distributor of all control groups. By jumpering, made there, the outputs of the switching multiple H in the first directional grid I. RKF are led to the junction sets B–VS of the A-groups. If the exchange is to handle also throughgoing traffic, e.g. subsidiary offices, connections to the control groups for the outgoing external traffic are required, the so-called D-groups. The junction sets C–VS have access to the registers C–R*g* via a register finder grid R*g*KF. An intermediate stage marker set ZSM1 serves for the route search in the register finder grid R*g*KF, whereby a group marker C–GM supervises the proper run-down of the function and secures that two or more marking processes are never carried out at the same time. The route search in the first directional grid I. RKF is made by an intermediate stage marker ZSM2. The directional marker RM with the group connector GV and the guide network group diverter LN–GW have the same tasks in the C-groups as the corresponding facilities of the A-groups.

FIG. 3 finally shows the control groups for outgoing external traffic, the so-called D-group in a block diagram. As already mentioned line groups with a high traffic ratio are directly branched off in rear of the switching stages H of the first directional grid I. RKF of an A-group, while the trunk or line groups with a longer traffic rate can be reached only via a second or third directional grid II. RKF or III. RKF, respectively. Each outgoing line L*g* is led via a junction set D–VS, which on one hand permits the access of the markers to the individual lines and on the other hand serves for the adaptation to the conditions of the outgoing lines L*g*. An intermediate stage marker ZSM performs the route search in the switching stages J, K, L and M of the second and third directional grids II. RKF and III. RKF, while a guide network directional diverter LN–RW receives the information items on the group to be actuated and marks the junction sets D–VS of all lines of this group. A group marker D–GM finally secures that only one A-group or C-group carries out simultaneously a marking process to said D-group. Moreover, this group marker D–GM supervises the run-down of the function.

The foregoing explanations indicate that such a subdivision of an exchange into the different control groups requires a considerable expenditure in control facilities. Each control group has separate central control devices which handle a more intense traffic the higher their function speed is.

With such an unflexible grouping of an exchange system the capacity for quickly operating electronic control devices is not fully used, if in smaller exchanges the control groups fall short of a defined size.

It is the object of the invention to modify the subdivision of control groups in telecommunication and particularly in telephone exchange systems in such a way that the central control devices and the switching grids are used more intensely. The control facility for centrally controlled switching grids in telecommunication, and particularly in telephone exchange systems, is subdivided into different control groups for originating and terminating internal traffic, for terminating external traffic and for outgoing external traffic. It is characterized in this that a directional grid with a common directional marker is associated with a control group for the originating and terminating internal traffic and to a control group for outgoing external traffic. The terminating device of one of these control groups is actuated by a common group marker via a common final marker. This concentration in control of an A-group with a D-group results in a common directional grid and in a saving of markers.

According to a further embodiment of the new control device the actuation of the different indicators can be eased in that the final marker is subdivided into two functional units, serving the two different groups of output devices. According to the invention connections from the junction set of the calling subscriber to the junction set of the called subscribers can be established via the common directional grid in the control group for originating and terminating internal traffic, as well as connections to the junction set of an outgoing line of the control group for the outgoing external traffic.

The expenditure in control devices and crosspoint elements can be further reduced at this concentration of control groups for the originating and terminating internal traffic and for outgoing external traffic in that the directional grid of a control group for terminating external traffic is combined with the common directional grid of both control groups for the originating and terminating internal traffic and for outgoing external connections, and that the functions of the directional marker of the control group for the terminating external traffic is taken over by the common directional marker of both combined control groups.

Figure 4:
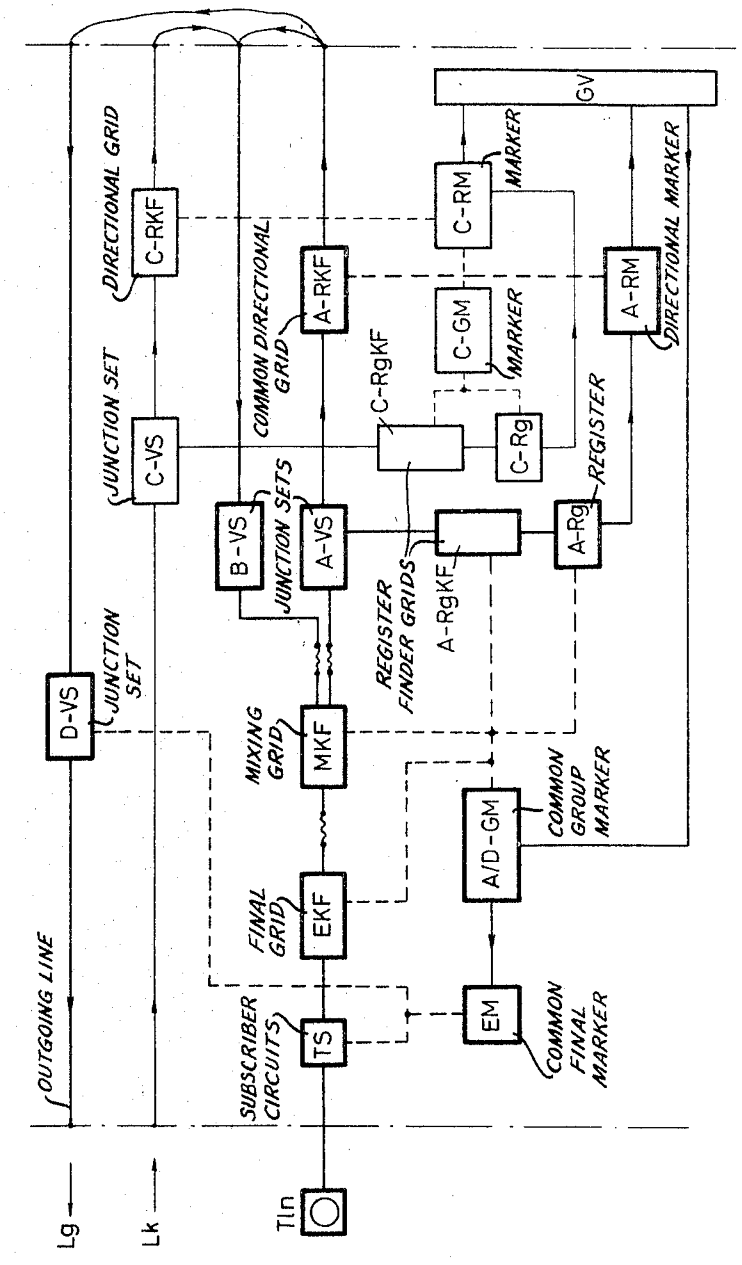
FIG. 4 illustrates in block diagram form the arrangements of this invention for reducing the amount of equipment necessary in an exchange using the three groups of control equipment.

The invention is in detail explained with the block diagram shown on FIG. 4. This block diagram shows the concentration of an A-group and of a D-group according to the invention with regard to the controlling functions.

The facilities drawn on FIG. 4 in thick lines demonstrate the concentration of an A-group and of a D-group.

Figure 1:
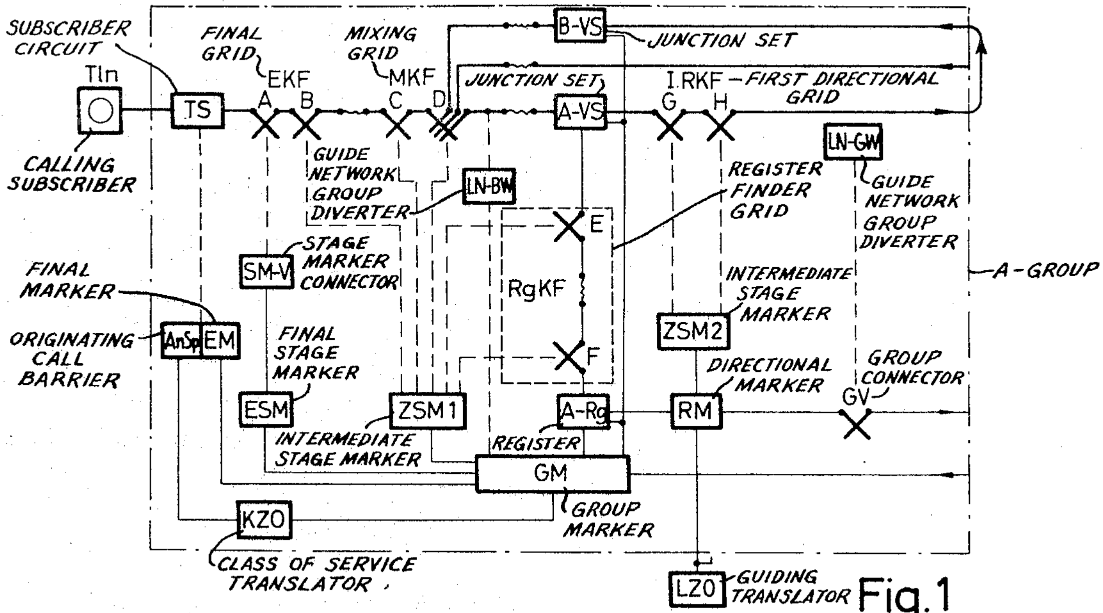
FIGS. 1–3 illustrate in functional blocks diagram form the arrangement of control equipment into the three groups.

In conjunction herewith only the deviations from an unflexible grouping according to FIGS. 1 and 3 are emphasized. The junction set A–VS reaches a junction set B–VS of the particular A-group or of another A-group as well as a junction set D–VS of an outgoing line L*g* via a directional grid A–RKF, used for both groups A and D. The marking is performed by the common directional marker A–RM which receives the setting information through a register A–R*g*, connected to the junction set A–VS.

The establishment of a connection to the call subscriber or to the junction set D–VS of an outgoing line L*g* is controlled through a group marker A/D–GM, common to both groups, with the aid of a common final marker EM. The final marker EM has access to the subscriber circuits TS and to the junction sets D–VS at the outgoing lines L*g*.

Comparing the expenditure in control devices of this combined control group with the expenditure of the two sole control groups according to FIGS. 1 and 3 the savings can be clearly seen, particularly in the switching network and on markers.

A further simplification in the control can be achieved in that the directional grid C–RKF of a control group for the terminating external traffic is combined with the common direction grid A–RKF of both control groups A and D. The functions of the markers C–GM and C–RM can then be taken over from the directional marker A–RM and from the common group marker A/D–GM. But it is then recommended to combine the two register finder grids A–R*g*KF and C–R*g*KF to a common register buffer grid which provides access to the common registers for the junction sets A–VS and C–VS. These registers then co-operate with the directional marker, in common for the three control groups A, C and D.

The selection of the direction in the control group for the outgoing external traffic can be extended in that a part of the mixing grid MKF of the control group for the originating and terminating internal traffic is arranged as a second directional grid of the control group for the outgoing external traffic. The common group marker A/D–GM controls the thus provided second directional grid.

While the principles of the invention have been described in connected with specific apparatus and application, it is to be understood that this description is made only by way of example, not as a limitation on the scope of the invention.

What is claimed is:

1. An arrangement of control equipment for telecommunication exchanges, said exchanges comprising a plurality of line circuits for connecting said exchange to individual subscriber lines, a plurality of incoming and outgoing trunk circuits for terminating incoming and outgoing trunks, respectively, said exchange having the control circuits thereof arranged in three different groups of control equipment, the first of said groups of control equipment controlling local calls, the second of said groups of control equipment controlling incoming trunk calls, and the third group of control equipment controlling outgoing trunk calls, said means for selectively connecting said line circuits comprising switching means, said line circuits connected to one side of said switching means, first junction means connected to the other side of said switching means for servicing calls coming from said line circuits, second junction means also coupled to the other side of said switching means for servicing calls going to said line circuits, first directional grid means for selectively directing the calls from said first junction means to either said second junction means or to outgoing trunk circuits, first group marker means for controlling the selective operation of said switching means, and said first directional grid means being common to said third group for selectively directing calls to said outgoing trunk circuits, group marker means for controlling the second directional grid means.

2. The arrangement of claim 1 wherein said switching means comprises a mixing stage and a final stage, and wherein means are provided for using a portion of said mixing stage as an additional direction grid.

No References Cited

WILLIAM C. COOPER, Primary Examiner